United States Patent
Bower

[11] Patent Number: 5,135,156
[45] Date of Patent: Aug. 4, 1992

[54] METHOD OF PRODUCING NICKEL-ALLOY HONEYCOMB PANELS

[75] Inventor: Raymond B. Bower, Gig Harbor, Wash.

[73] Assignee: The Boeing Company, Seattle, Wash.

[21] Appl. No.: 771,429

[22] Filed: Oct. 4, 1991

[51] Int. Cl.⁵ .................. B23K 31/02; B23K 101/02
[52] U.S. Cl. ...................... 228/181; 228/215; 148/286; 428/593
[58] Field of Search ............... 228/181, 215; 148/286; 428/593

[56] References Cited

U.S. PATENT DOCUMENTS

| | | | |
|---|---|---|---|
| 2,392,886 | 1/1946 | Stecher et al. | 228/215 X |
| 3,136,633 | 6/1964 | Berry . | |
| 3,577,233 | 5/1971 | Gamer | 73/134 |
| 3,656,224 | 4/1972 | Blair et al. | 228/181 |
| 3,663,217 | 5/1972 | Olson et al. | 75/165 |
| 3,675,311 | 7/1972 | Wells | 29/498 |
| 3,949,118 | 4/1976 | Nagano et al. | 427/57 |
| 4,023,251 | 5/1977 | Darrow | 228/215 |
| 4,097,312 | 6/1978 | Dorsey | 148/6.27 |
| 4,293,089 | 10/1981 | McCormick | 228/215 |
| 4,439,248 | 3/1984 | Herchenroeder et al. | 148/6.2 |
| 4,447,391 | 5/1984 | Mizuhara | 420/456 |
| 4,448,605 | 5/1984 | Mizuhara | 75/123 H |
| 4,456,223 | 8/1984 | Cammarano et al. | 228/198 |
| 4,473,621 | 9/1984 | Drylie | 428/576 |
| 4,486,386 | 12/1984 | Mizuhara | 420/508 |
| 4,606,978 | 8/1986 | Mizuhara | 428/606 |
| 4,690,876 | 9/1987 | Mizuhara | 428/606 |
| 4,737,200 | 4/1988 | Herchenroeder | 148/6.3 |
| 4,786,566 | 11/1988 | Siemers | 428/568 |
| 4,948,774 | 8/1990 | Usui et al. | 428/593 |

*Primary Examiner*—Kenneth J. Ramsey
*Attorney, Agent, or Firm*—Christensen, O'Connor, Johnson & Kindness

[57] ABSTRACT

A method for pre-oxidizing a nickel alloy honeycomb core by heating the core while exposing the core to a controlled flow of an oxygen containing gas, such as dry air. The preoxidized core can be brazed in a vacuum furnace to two face sheets to manufacture a honeycomb panel using thin foil brazing material. The methods of preoxidation and panel production for Inconel 718, Rene' 41 and Inconel 625 are specifically described.

19 Claims, 2 Drawing Sheets

METHOD OF PRODUCING NICKEL-ALLOY HONEYCOMB PANELS

FIELD OF THE INVENTION

This invention relates to a method for producing a honeycomb panel made of a nickel alloy.

BACKGROUND OF THE INVENTION

A honeycomb panel consists of a honeycomb core brazed to two face sheets. Honeycomb panels of various nickel alloys, such as Rene' 41, Inconel 718, or Inconel 625, are frequently used in panels exposed to elevated temperatures, such as the exterior skin of a space vehicle when it reenters the atmosphere or the skin of an airplane exposed to substantial air friction or hot exhaust gasses. As used herein, a nickel alloy is any alloy which contains more Nickel by weight than any other element, and preferably an alloy which contains at least approximately 50% Nickel by weight.

Inconel 718 is the trademark of INCO Alloys International, Inc. for a nickel alloy consisting of approximately 52.5% Nickel, 19% Chromium, 3% Molybdenum, 5.1% Niobium, 0.9% Titanium, 0.5% Aluminum, and 18.5% Iron, by weight. Rene' 41 is the trademark of General Electric Co. for a nickel alloy consisting of approximately 55% Nickel, 19% Chromium, 10% Molybdenum, 11% Cobalt, 3.1% Titanium, 0.09% Carbon, 0.01% Boron, and 1.5% Aluminum, by weight. Inconel 718 and Rene' 41 are precipitation-hardenable and heat-treatable nickel alloys. Inconel 625 is the trademark of INCO Alloys International, Inc. for a nickel alloy consisting of approximately 61% Nickel, 21.5% Chromium, 9% Molybdenum, 3.6% Niobium, 0.2% Titanium, 0.2% Aluminum, 2.5% Iron, and 0.05% Carbon, by weight. Inconel 625 is a solid-solution and nonheat-treatable nickel alloy.

The metal foil used to manufacture the cores for these nickel-alloy panels typically has a thickness of 0.015 inch to 0.025 inch. Prior brazing materials used on such panels were usually nickel-based alloys containing boron, silicon, or other elements which tended to erode the thin foil of these cores. This erosion substantially weakened the core and reduced both the face sheet tension strength and peel strength of the panel. In addition, these prior brazing materials had a relatively low ductility which also reduced the strength of the panels.

Many of the nickel-based brazing materials, especially those formulated to be less erosive to thin sections, are generally available only in powder form, which requires a long and tedious application process. Specifically, a liquid binder is applied to both face sheets and the powder brazing material is dusted onto the binder. Additional layers of binder and brazing material are added until the desired thickness of brazing material is obtained. The core is then placed on top of one of the face sheets. The other face sheet is flipped over and placed on top of the core, and the core and face sheets are placed in the brazing oven.

There are several disadvantages associated with the use of a powder brazing material. First, it is difficult to create a layer of brazing material having a uniform thickness over the entire surface of the face sheets. As a result, additional amounts of brazing material must be used to ensure that there is sufficient brazing material at all locations on the face sheets. Second, when the face sheet is flipped over and placed on top of the core, a portion of the brazing material may fall off the top sheet. This may also happen at any time after the panel is inserted in the furnace. Again, this necessitates the use of additional amounts of brazing material to obtain sufficient brazing material on the top sheet. Third, the liquid binder outgasses during the brazing process, contaminating the braze joint and the furnace atmosphere. This outgassing also requires longer brazing times to bake out the binder from the brazing material.

In manufacturing the panel, both face sheets are usually brazed to the honeycomb core at the same time, with one face sheet on top of the core and the other face sheet underneath the core in the brazing oven. Due to the force of gravity, and other factors, substantial amounts of brazing material frequently flow down the core away from the top face sheet as the brazing material melts. However, this flow of brazing material away from the top sheet is generally not uniform at all locations on the core. As a result, it is very difficult to uniformly braze the top face sheet to the core. Even if additional amounts of the brazing material are applied to the top sheet, smaller than optimum filets frequently result at various locations in the braze joint between the core and the top sheet. Moreover, the additional amount of brazing material increases the weight of the panel and the erosion of the honeycomb core.

It is recognized in the art that oxidizing a metal surface can reduce the flow of a braze material. However, this technique has not been routinely used for honeycomb core in the past, due to the difficulty in achieving a uniform and repeatable oxide layer on the interior surfaces of the core. If a portion of the interior surfaces of the core is not sufficiently oxidized, the flow of the brazing material may not be sufficiently reduced in that portion of the core, or that portion of the core may not be adequately protected from erosion. On the other hand, if a portion of the interior surface of the core is oxidized to too great an extent, that portion of the core can become brittle or otherwise lose its structural strength, or the braze material may not properly adhere to the core, thereby reducing the overall strength of the panel. A process for depositing a uniform oxide layer must also be repeatable from core to core. This lack of process repeatability has been a significant problem in the past.

Even if the interior surface of the core is uniformly oxidized to the proper extent, the oxidized layer is readily altered in the brazing oven. The atmosphere in the brazing oven can readily affect the oxide layer, through sublimation, reduction, or other processes.

SUMMARY OF THE INVENTION

The present invention comprises a method for pre-oxidizing a honeycomb core and a method for manufacturing a nickel-alloy honeycomb panel. In order to protect the core from erosion and prevent the brazing material from flowing into the honeycomb core, the interior surfaces of the core are oxidized prior to brazing the face sheets to the core. In Inconel 718 and Rene' 41, the oxides of Aluminum and Titanium are particularly effective in reducing or preventing the flow of brazing material into the honeycomb core. By evenly exposing the interior surfaces of the core to a controlled and preferably dispersed flow of an oxygen containing gas while the core is heated, a uniform oxide layer is consistently and repeatably formed on the interior surfaces of the core. The use of relatively dry air in the preferred embodiment also helps form a uniform and repeatable oxide layer. In Inconel 718 and Rene' 41, the oxide layer produced by the method of this invention is particularly rich in oxides of Aluminum and Titanium.

In the method for manufacturing a panel, the core is oxidized as described above, and then the core is cooled and the panel is assembled. In the preferred embodiments, a thin foil of brazing material is used instead of a powder brazing compound. The brazing material used is an alloy selected for the specific nickel alloy or alloys used in the core and face sheets and the intended use of the panel. The particular braze materials described herein are relatively ductile and can easily be rolled into a thin foil. Since the brazing material is a foil, it can be easily and uniformly applied between the core and the face sheets. Because no liquid binder is required, there is less contamination of the braze joints and no extended bake out is required. In the preferred embodiments for Inconel 718 and Rene' 41, a non-nickel alloy is used as the brazing compound to further limit erosion of the core.

In order to preserve the oxide layer on the interior surfaces of the core, the panels in the preferred embodiments are brazed at a relatively low and controlled atmospheric pressure. The low atmospheric pressure can be easily maintained at virtually all locations in the panel throughout the brazing process since there is no liquid binder to outgas or bake off. The process of the preferred embodiments also allows the panel to be heated to the brazing temperature and cooled from the brazing temperature at almost any rate desired, since binder outgassing and other process limitations are not present.

The nickel-alloy panels produced by the method of this invention, and in particular by the embodiments described herein, have various unique features over nickel-alloy panels produced by other methods. The interior surfaces of the core are sufficiently oxidized to effectively prevent the flow of brazing material into the core, without substantially weakening the core or reducing the flexibility of the core. The panels can be assembled much more easily since the brazing material is applied as a foil. Uniform filets of brazing material are formed where the core joins both face sheets. There is no need to use excess amounts of brazing material. There is little or no erosion of the core during the brazing step. Since there is no need to allow for escaping gas from the binder, there is more flexibility in the structural design of the core. The panel also has greater strength due to the ductility of the brazing material.

Panels produced by the preferred method of this invention have performance characteristics substantially beyond nickel-alloy panels produced by other methods, particularly at elevated temperatures such as 1250° F. for Inconel 718, 1550° F. for Rene' 41 and 1100° F. for Inconel 625. For example, the "peel strength" is a measure of the force substantially parallel to the panel required to peel the skin from the core. At elevated temperatures, the uniform filets of braze material and limited erosion of the core in the panels produced by the preferred methods of this invention result in a peel-strength up to approximately ten times greater than panels produced by other methods. As another example, the "face sheet tension" is a measure of the force substantially normal to the panel required to pull the face sheets from the core or cause the core to fail. At elevated temperatures, the face sheet tension is likewise up to approximately ten times greater for panels produced by the preferred methods of the present invention.

DETAILED DESCRIPTION OF THE PREFERRED EMBODIMENT

Figure 1:
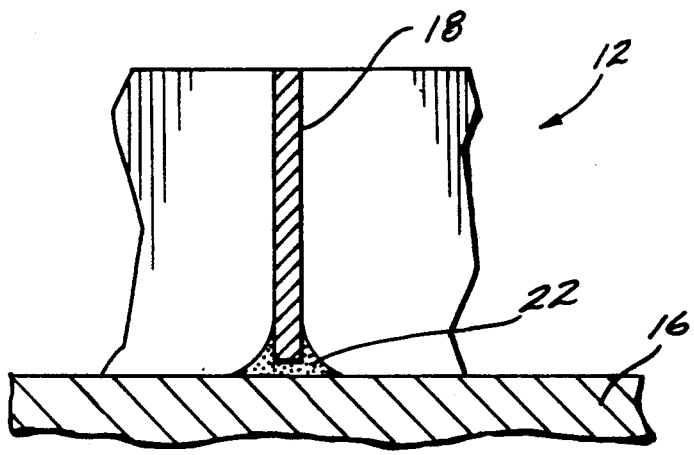
FIG. 1 is a cross section of the finished braze joint between the core and one face sheet.

In the preferred embodiment of the invention, a nickel-alloy honeycomb core 12 and two nickel-alloy face sheets 14 and 16 are solvent degreased and acid etched to remove all surface contaminants which might interfere with the oxidation and/or brazing processes. The core 12 and face sheets 14 and 16 are then rinsed in hot water and air dried.

Prior to brazing, the nickel-alloy core 12 is preoxidized by exposing the interior surfaces 18 of the core 12 to a controlled flow of a gas 20 containing oxygen while the core 12 is heated. The flow of gas 20 containing oxygen over the interior surfaces 18 is intended to expose all such surfaces 18 to a relatively constant partial pressure of oxygen during the preoxidation process. As a result, the interior surfaces 18 of the core 12 are oxidized at a uniform and predictable rate. This in turn allows the interior surfaces 18 of the core 12 to be repeatably and uniformly oxidized to the extent necessary to effectively prevent the flow of brazing material 22 down the core 12 when the core 12 is brazed, without substantially weakening the core 12 or reducing the flexibility of the core 12.

Figure 3:
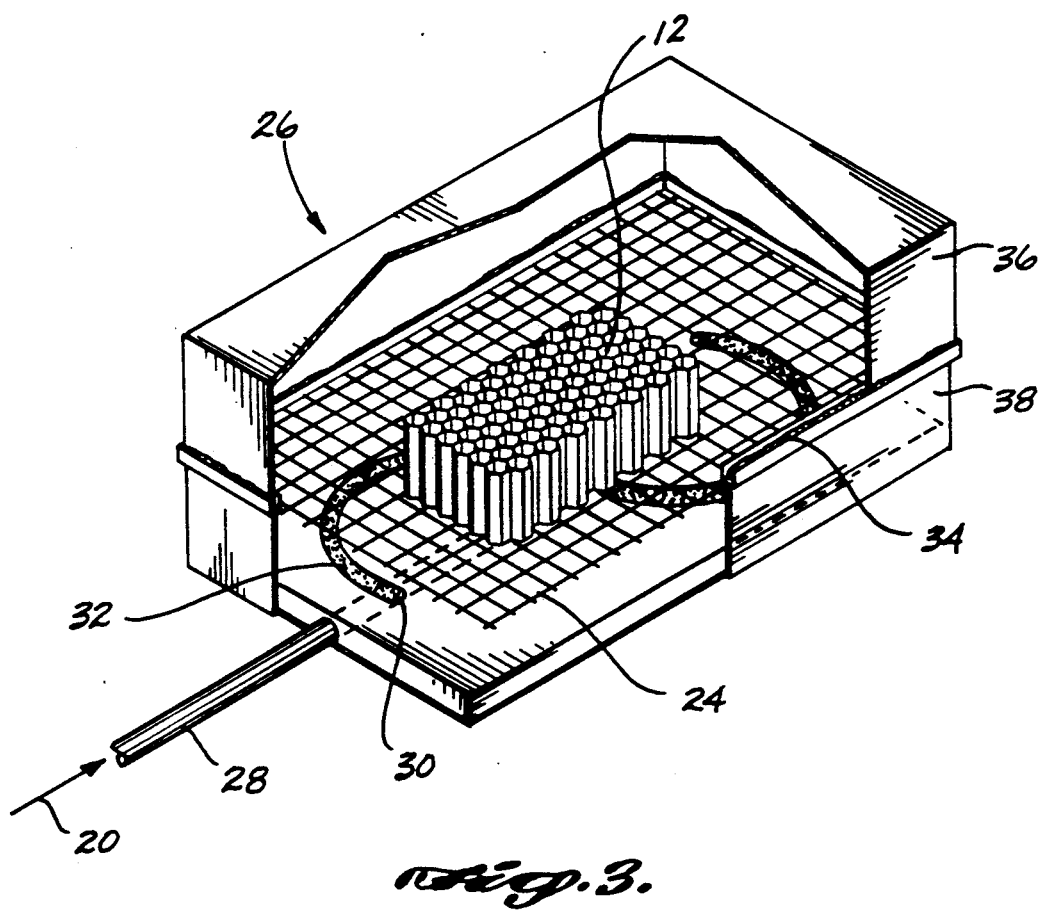
FIG. 3 is a cutaway view of the vessel used in the oxidation step.

In one preferred embodiment, the preoxidation step is accomplished in the following manner. The core 12 is placed on a wire rack 24 in a stainless steel vessel 26, shown schematically in FIG. 3. A gas input tube 28 passes into the vessel 26 and opens into an S-shaped dispersion tube 30 below the wire rack 24. The dispersion tube 30 has hundreds of very small holes 32 so that when gas 20 is supplied under pressure to the input tube 28, the gas 20 is uniformly dispersed below the wire rack 24.

A layer of sand 34 between the lid 36 of the vessel 26 and the remainder 38 of the vessel 26 allows the gas 20 to escape from the vessel 26 as additional gas 20 is supplied under pressure through the input tube 28. The layer of sand 34 also tends to prevent gas from entering the vessel 26 except through the input tube 28.

The core 12 is heated inside the vessel 26 in a hot circulating air furnace (not shown) to a temperature and for a period of time necessary to produce the desired oxide layer on the interior surfaces 18 of the core 12. For Inconel 718, the core 12 is preferably held at a temperature of approximately 975°±25° F. for approximately 1.0±0.1 hour. For Rene' 41, the core 12 is preferably held at a temperature of approximately 1225°±25° F. for approximately 3.0±0.1 hours. For Inconel 625, the core 12 is preferably held at a temperature of approximately 1525°±25° F. for approximately 2.0±0.1 hour. The ranges for temperature and duration set forth above have been found to produce the desired oxide layer but are not intended to limit the scope of the present invention. For example, the amount of time the core is held at the recited temperatures can probably be increased to some extent without adversely affecting the method described herein. More generally, it is anticipated that the temperatures and durations can be modified to some degree to produce the desired oxide layer.

While the core 12 is heated, the gas 20 is supplied under pressure to the interior of the vessel 26 through the input tube 28. In the preferred embodiment, the gas 20 is dry air, having a dew point of approximately −63.6° F. (at 760 mm Hg) which is supplied at a rate of at least 6.25 cubic feet per hour multiplied by the interior volume of the vessel 26 in cubic feet, but not less than 20 cubic feet per hour. In the preferred embodiment, the air is continuously supplied from at least one-half hour before the vessel 26 is placed in the oven until the vessel 26 is removed from the oven. As soon as the vessel 26 is removed from the oven, the core 12 is removed from the vessel 26 and allowed to cool.

Figure 2:
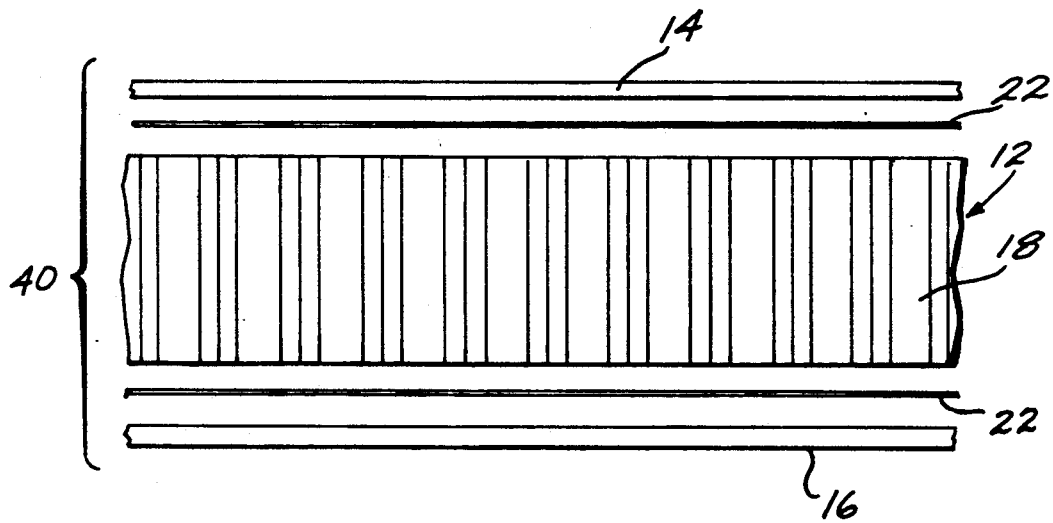
FIG. 2 is an exploded view of the panel prior to the brazing step.

Once the core 12 is cooled, the panel 40 is assembled for brazing. A thin foil sheet of brazing material 22 is placed between the core 12 and each of the face sheets 14 and 16 as shown in FIG. 2. The brazing material 22 may be spot welded to the face sheets 14 and 16 to facilitate assembly of the panel 40. The foil sheet 22 is a few thousandths of an inch thick and is made from a brazing alloy selected to complement the alloy or alloys of the core and fact sheets. The selection of the brazing alloy may also depend on the intended use of the panel. For Inconel 718, the preferred brazing alloy is 30% Copper, 25.5% Gold, 18.5% Nickel, 15.5% Palladium and 10.5% Manganese. For Rene' 41, the preferred brazing alloy is 63% Gold, 20.5% Nickel, 10% Chromium and 6.5% Palladium. For Inconel 625, the preferred brazing alloy is 82.5% Nickel, 7% Chromium, 3% Boron, 4.5% Silicon and 3% Iron. The percentage compositions of the above brazing alloys have a tolerance of at least approximately 1% (e.g., the preferred brazing alloy for Inconel 718 may contain from 14.5% to 16.5% Palladium). Other brazing alloys may also be used.

After the panel 40 has been assembled, the two face sheets 14 and 16 are brazed onto the core 12 in a vacuum brazing oven (not shown). In order to prevent degradation of the oxide layer on the interior surfaces 18 of the core 12, the atmospheric pressure in the brazing oven is held between approximately 0.00005 torr and 0.001 torr while the face sheets 14 and 16 are brazed to the core 12. The brazing temperature is selected based upon the alloys used in the panel 40 and brazing material 22. For the Inconel 718 panel 40 described herein, the brazing temperature is at least approximately 1950°±20° F. For the Rene' 41 panel 40 described herein, the brazing temperature is at least approximately 1980°±20° F. For Inconel 625 panel 40 described herein, the brazing temperature is at least approximately 1915°±20° F.

Since there is no liquid binder required, there is no need to "bake out" the panel 40 during the brazing process. Therefore, the panel 40 does not need to be held at any intermediate temperatures, and only needs to be held at the brazing temperature for approximately three minutes. In addition, since the brazing material 22 generally will not flow or fall away from the upper face sheet 14, the panel 40 can be heated to the brazing temperature and cooled from the brazing temperature at a rate designed to limit or minimize the distortion of the panel 40.

It is anticipated that the method of this invention will work equally well for virtually any nickel alloy, with appropriate modifications to (a) the oxidation temperature and duration, (b) the brazing material, and (c) the brazing temperature and duration.

The embodiments of the invention in which an exclusive property or privilege is claimed are defined as follows:

1. A method for producing an oxide layer on the interior surfaces of a nickel-alloy honeycomb core, the method comprising heating the core to a temperature sufficient to cause oxidation of the interior surfaces of the core while exposing the interior surfaces of the core to a controlled flow of a gas containing oxygen.

2. The method of claim 1, wherein the core is exposed to the gas in a manner to produce a generally uniform and repeatably thick oxide layer on the interior surfaces of the core.

3. The method of claim 1, wherein:
   (a) the core is heated in the interior of a substantially closed vessel;
   (b) the gas is dry air; and
   (c) the gas is forced into the vessel at a rate of at least approximately 6.25 cubic feet per hour multiplied by the interior volume of the vessel in cubic feet.

4. The method of claim 3, wherein the rate the gas is forced into the vessel is approximately equal to 6.25 cubic feet per hour multiplied by the interior volume of the vessel in cubic feet.

5. The method of claim 3, wherein the gas is forced into the interior of the vessel at a multitude of locations to evenly expose the interior surfaces of the core to the gas forced into the vessel.

6. The method of claim 3, wherein:
   (a) the nickel-alloy is Inconel 718;
   (b) said temperature is approximately 975° F.; and
   (c) the core is exposed to said temperature and flow for at least approximately one hour.

7. The method of claim 3, wherein:
   (a) the nickel-alloy is Rene' 41;
   (b) said temperature is approximately 1225° F.; and
   (c) the core is exposed to said temperature and flow for at least approximately three hours.

8. The method of claim 3, wherein:
   (a) the nickel-alloy is Inconel 625;
   (b) said temperature is approximately 1525° F.; and
   (c) the core is exposed to said temperature and flow for at least approximately two hours.

9. A method for producing a nickel-alloy honeycomb panel having a honeycomb core and first and second face sheets, the method comprising the following steps:
   (a) oxidizing the interior surfaces of the core by heating the core in the interior of a substantially closed vessel to a first temperature sufficient to cause the oxidation of the interior surfaces of the core while forcing dry air into the vessel at a multitude of locations and at a flow rate of at least approximately 6.25 cubic feet per hour multiplied by the interior volume of the vessel in cubic feet; and
   (b) then brazing the core to the first and second face sheets in a vacuum furnace at a pressure between approximately 0.00005 torr and approximately 0.001 torr and a second temperature sufficient to melt the brazing material.

10. The method of claim 9, wherein the brazing step includes and further comprises:
   (a) use of a thin foil sheet of brazing material between the core and each of the face sheets;
   (b) heating the core, brazing material and face sheets to the second temperature at a controlled rate to limit distortion of the panel;

(c) holding the core, brazing material and face sheets at the second temperature for at least approximately 3 minutes; and (d) cooling the core, brazing material and face sheets from the second temperature at a controlled rate to limit the distortion of the panel.

11. The method of claim 10, wherein the brazing material is an alloy which contains less than approximately 50% Nickel by weight.

12. The method of claim 11, wherein:

(a) the honeycomb panel and face sheets are made of Inconel 718;

(b) the brazing material is an alloy comprising the following elements in approximately the following proportions by weight: 30% Copper, 25.5% Gold, 18.5% Nickel, 15.5% Palladium, and 10.5% Manganese;

(c) the first temperature is approximately 975° F.;

(d) the core is exposed to said first temperature and flow for at least approximately one hour during the oxidizing step; and (e) the second temperature is approximately 1950° F.

13. The method of claim 11, wherein:

(a) the honeycomb panel and face sheets are made of Rene' 41;

(b) the brazing material is an alloy comprising the following elements in approximately the following proportions by weight: 63% Gold, 20.5% Nickel, 10% Chromium, and 6.5% Palladium;

(c) said first temperature is approximately 1225° F.;

(d) the core is exposed to said first temperature and flow for at least approximately 3 hours during the oxidizing step; and (e) the second temperature is approximately 1980° F.

14. The method of claim 10, wherein:

(a) the honeycomb panel and face sheets are made of Inconel 625;

(b) the brazing material is an alloy comprising the following elements in approximately the following proportions by weight: 82.5% Nickel, 7% Chromium, 3% Boron, 4.5% Silicon and 3% Iron;

(c) the first temperature is approximately 1525° F.;

(d) the core is exposed to said first temperature and flow for at least approximately two hours during the oxidizing step; and (e) the second temperature is approximately 1915° F.

15. The panel produced by the method of claim 10.

16. The panel produced by the method of claim 11.

17. The panel produced by the method of claim 12.

18. The panel produced by the method of claim 13.

19. The panel produced by the method of claim 14.

* * * * *